United States Patent [19]
Mallinson et al.

[11] Patent Number: 5,487,876
[45] Date of Patent: Jan. 30, 1996

[54] APPARATUS AND METHOD FOR CONTINUOUS SYNTHESIS OF VANADIUM OXIDE

[76] Inventors: Steven M. Mallinson, 446 Hassinger Rd., San Jose, Calif. 95111; Michael E. McAleavey, 559 Gettysburg Dr., San Jose, Calif. 95123

[21] Appl. No.: 312,973

[22] Filed: Sep. 30, 1994

Related U.S. Application Data

[63] Continuation of Ser. No. 104,306, Aug. 9, 1993, abandoned, which is a continuation of Ser. No. 42,356, Apr. 2, 1993, abandoned.

[51] Int. Cl.⁶ .................................................. F28D 21/00
[52] U.S. Cl. ........................ 422/205; 422/198; 422/199; 422/202; 422/210; 422/225; 422/259; 422/307; 422/308
[58] Field of Search .................. 422/198–201, 422/205, 209, 210, 224, 225, 259, 307–308; 406/62, 63, 65, 128, 129, 130, 135–137, 146; 414/217, 218, 150, 221; 198/608, 603, 803.16, 560; 34/181, 182, 363, 367, 578, 580, 583, 586

[56] References Cited

U.S. PATENT DOCUMENTS

| | | | |
|---|---|---|---|
| 679,604 | 7/1901 | Cook | 422/308 |
| 1,196,597 | 8/1916 | Sheppard, Jr. | 422/308 |
| 1,309,595 | 7/1919 | Fryant et al. | 422/308 X |
| 1,940,585 | 12/1933 | Fauth . | |
| 2,379,724 | 7/1945 | Lanham | 222/252 X |
| 2,797,908 | 7/1957 | Zubrzycki | 422/139 X |
| 3,484,948 | 12/1969 | Whelan . | |
| 4,176,987 | 12/1979 | Reed et al. | 406/63 X |
| 4,319,410 | 3/1982 | Heilhecker et al. . | |
| 4,392,310 | 7/1983 | Hohman et al. | 198/603 X |
| 4,486,400 | 12/1984 | Riley . | |
| 4,618,294 | 10/1986 | Brown | 406/63 X |
| 4,681,484 | 7/1987 | Egger | 406/63 |
| 5,178,077 | 1/1993 | Norris et al. . | |

*Primary Examiner*—James C. Housel
*Assistant Examiner*—Jan M. Ludlow

[57] ABSTRACT

In a method for the continuous synthesis of vanadium oxide from ammonium metavanadate, ammonium metavanadate is fed to the interior of a dryer apparatus through an inlet opening. The interior of the apparatus is maintained at a temperature of approximately 440° C. and an inert carrier gas flows through the interior of the apparatus. The ammonium metavanadate is conveyed through the interior of the dryer apparatus on a conveyer to an outlet opening over a period of approximately two hours, during which period the ammonium metavanadate is continuously agitated so that it is uniformly exposed to heat and to the carrier gas, thereby synthesizing homogeneous vanadium oxide. The vanadium oxide is continuously removed from the apparatus.

28 Claims, 4 Drawing Sheets

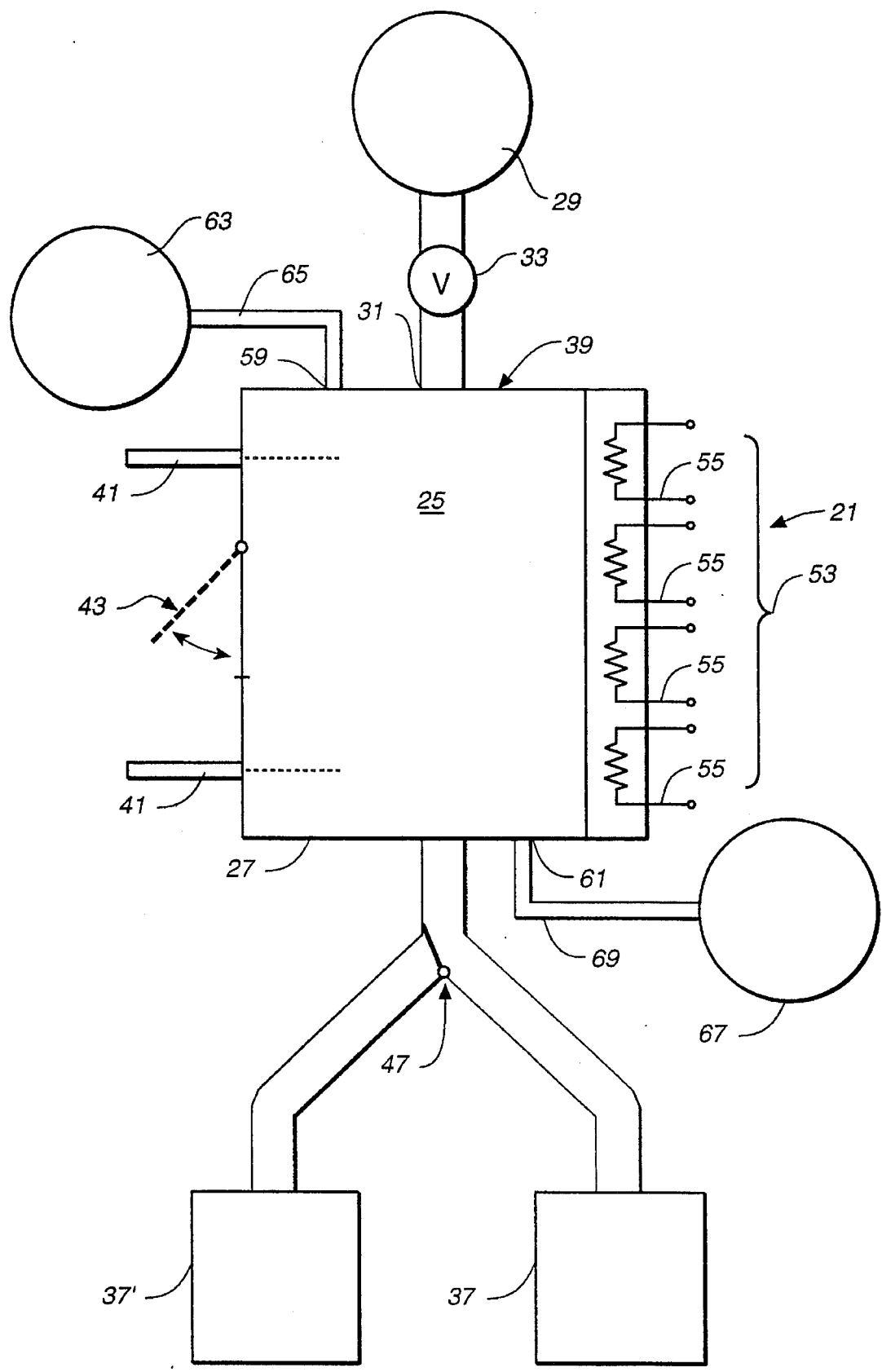
FIG._1

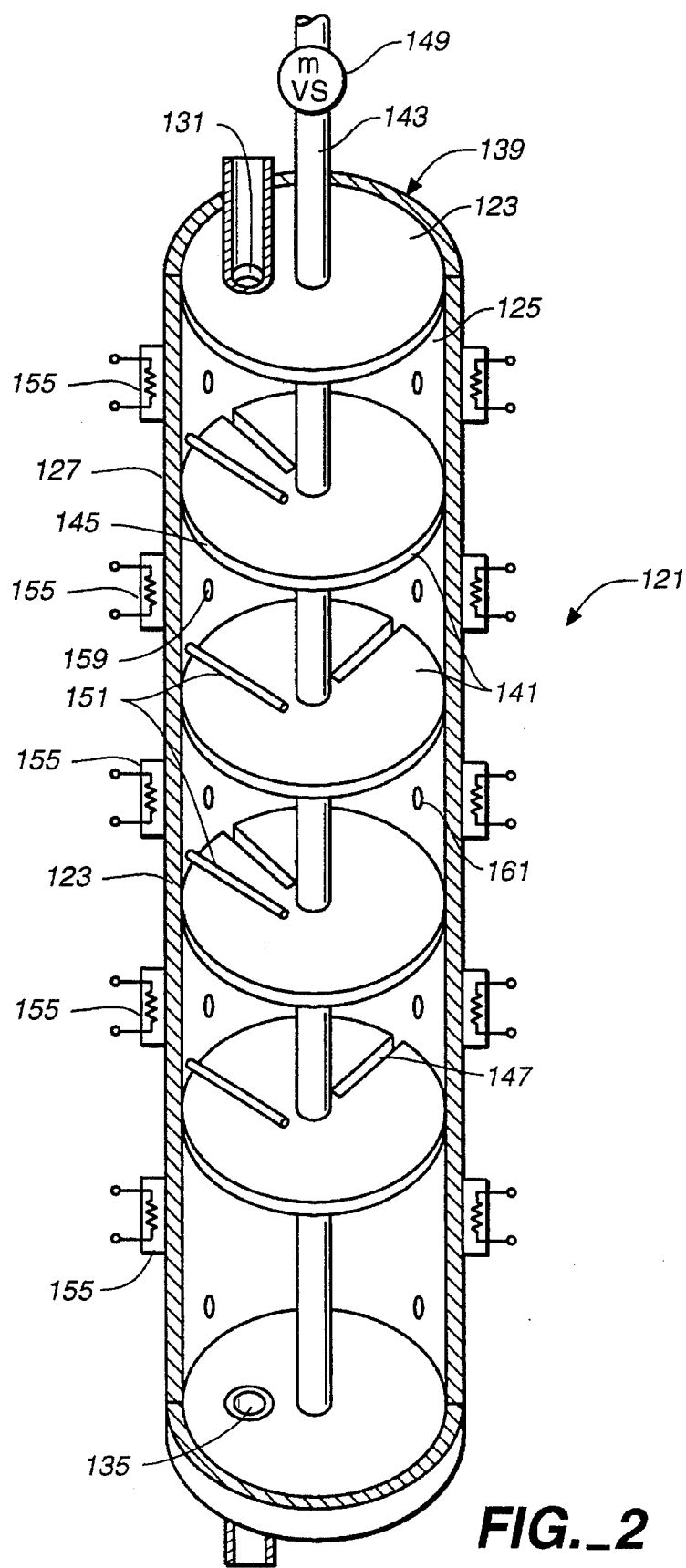
FIG._2

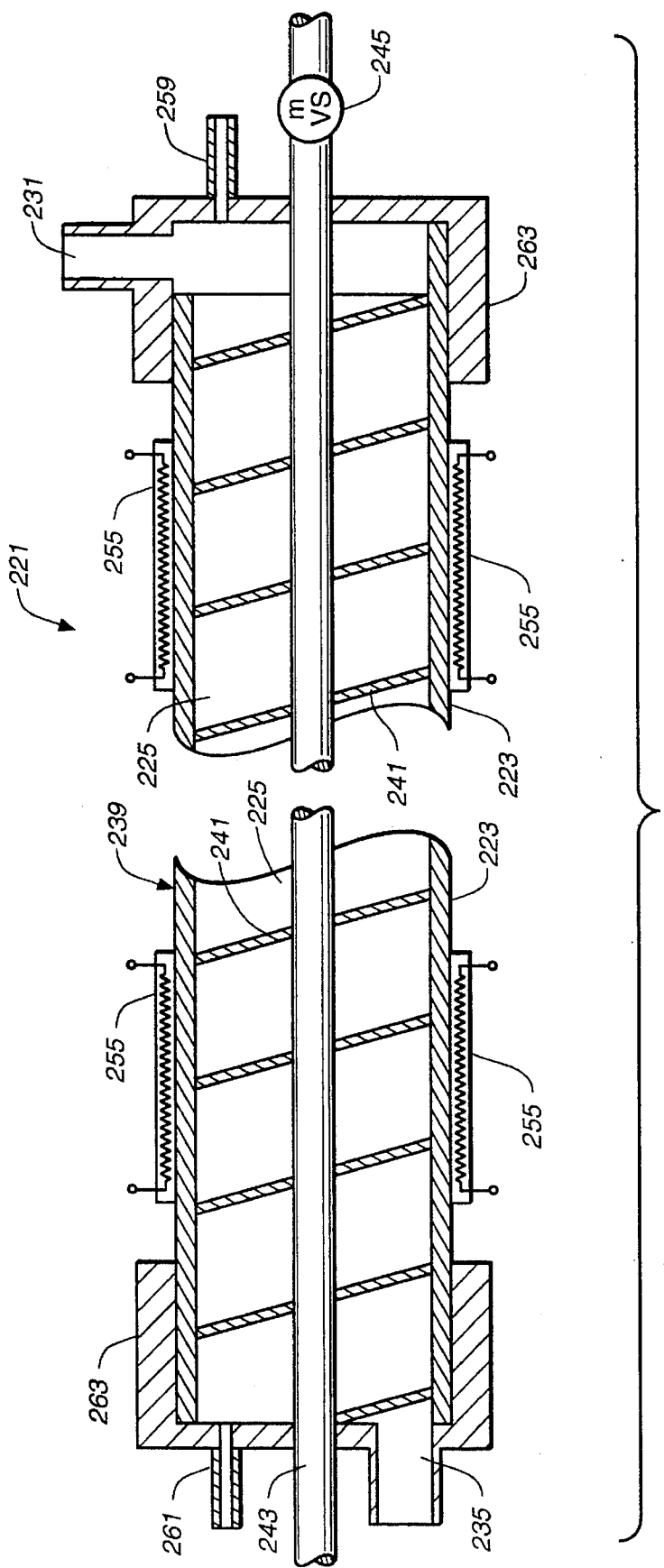
FIG._3

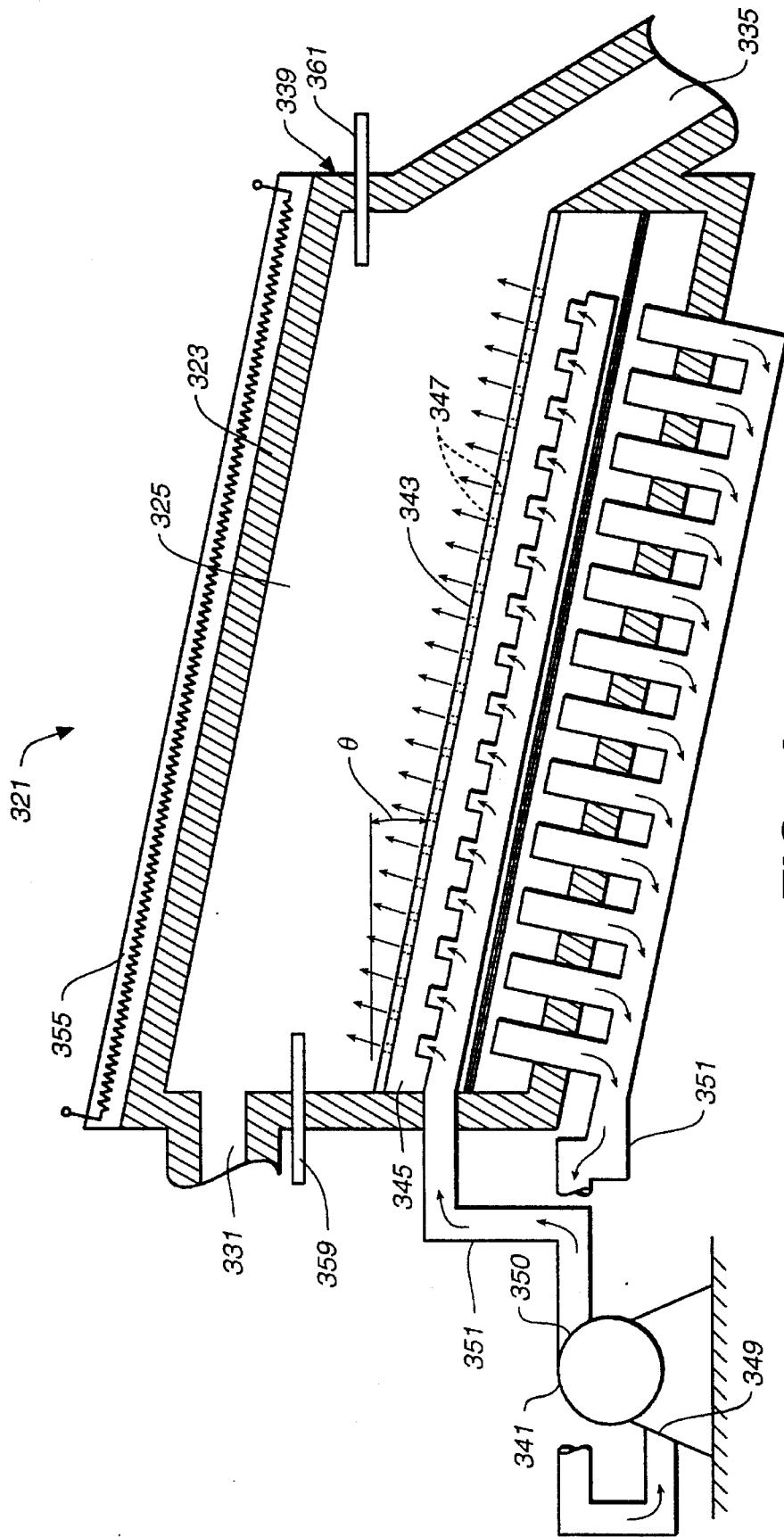
FIG._4

APPARATUS AND METHOD FOR CONTINUOUS SYNTHESIS OF VANADIUM OXIDE

This application is a continuation of application Ser. No. 08/104,306, filed Aug. 9, 1993, now abandoned, which is a continuation of application Ser. No. 08/042,356, filed Apr. 2, 1993, now abandoned.

BACKGROUND OF THE INVENTION

1. Field of the Invention

The present invention relates to a method and apparatus for the synthesis of vanadium oxide and, more particularly, to a method and apparatus for the continuous synthesis of vanadium oxide.

2. State of the Art

Various vanadium oxides are used as an active cathode material in primary and secondary batteries, particularly $V_6O_{13}$ and $V_3O_8$ (hereinafter referred to generally as vanadium oxide). Most known processes for the synthesis of vanadium oxide produce vanadium oxide in batch form. For example, one of the techniques for synthesis of vanadium oxide involves the decomposition of ammonium metavanadate $NH_4VO_3$ at elevated temperatures in an inert atmosphere. Subsequent steps involve maintaining the material at elevated temperatures for between twelve and sixteen hours, and subsequently cooling the vanadium oxide to room temperature.

As another example, the article *Large Scale Preparation of Non-Stoichiometric $V_6O_{13}$*, Pryor et al., Preprint from the 16th International Power Sources Symposium (1988), describes the synthesis of large (e.g. 500 grams) batches of vanadium oxide in a rotating drum that is sealed, purged with argon, heated to and maintained at 700° K. for four hours, and then cooled to below 370° K. before removing the product. According to the article, the primary objectives of the process were stoichiometric control and uniformity of product. According to the article, the important parameters in achieving the objectives were: 1) uniform heating and good temperature control: 2) even exposure of the material to evolved $NH_3$; 3) control of the rate of $NF_3$ removal: and 4) total exclusion of air.

The above-described process has, however, various shortcomings. For instance, the process requires relatively long periods for preparation of a batch. Further, because the process is a batch process, there are inherent risks. For example, if a batch is bad, then other production steps depending upon production of the batch are delayed. Further, batch processes are typically characterized by the need for workers to handle trays containing ammonium metavanadate or vanadium oxide, both of which are toxic, while transporting material to and from processing apparatus.

SUMMARY OF THE INVENTION

The present invention, generally speaking, provides a method and apparatus for continuously synthesizing vanadium oxide in a manner such that worker exposure to ammonium metavanadate or vanadium oxide is minimized. In accordance with one particular aspect of the present invention, during the continuous synthesis of vanadium oxide, the interior of a dryer is maintained at a temperature of approximately 440° C. while the interior of the dryer is continuously purged with an inch carrier gas and ammonium metavanadate is supplied to the interior of the dryer. Ammonium metavanadate is agitated in the heated dryer over a period of approximately two hours such that the ammonium metavanadate is uniformly exposed to heat.

In accordance with another aspect of the present invention, an apparatus for the continuous synthesis of vanadium oxide from ammonium metavanadate includes means for continuously introducing ammonium metavanadate to the interior of the apparatus. Means are provided for heating the interior of the apparatus to a temperature of approximately 440° C. The apparatus further includes means for purging the interior of the apparatus with an inert carrier gas to remove ammonia, water vapor, and oxygen that evolves from heated ammonium metavanadate. Means are provided for continuously agitating ammonium metavanadate in the interior of the apparatus while the interior of the apparatus is heated by the heating means and while ammonia, water vapor, and oxygen are purged by the purging means such that ammonium metavanadate is uniformly exposed to heat and purging gas. Means are also provided for continuously removing vanadium oxide from the interior of the apparatus through an outlet.

BRIEF DESCRIPTION OF THE DRAWINGS

The present invention can be further understood with reference to the following description in conjunction with the appended drawings, wherein like elements are provided with the same reference numerals. In the drawings:

FIG. 1 is a schematic view of a dryer apparatus according to an embodiment of the present invention;

FIG. 2 is a schematic, partially cross-sectional perspective view of a portion of a dryer apparatus including a rotary, tray apparatus according to an embodiment of the present invention:

FIG. 3 is a schematic, cross-sectional side view of a portion of a dryer apparatus including a rotary calciner apparatus according to an embodiment of the present invention: and FIG. 4 is a schematic, partially cross-sectional side view of a portion of a dryer apparatus including a fluidized bed apparatus according to an embodiment of the present invention.

DETAILED DESCRIPTION OF THE PREFERRED EMBODIMENTS

As shown in FIG. 1, a dryer apparatus 21 is provided for the synthesis of vanadium oxide. e.g., $V_3O_8$ or, preferably, $V_6O_{13}$ (hereinafter referred to generally as vanadium oxide/ from ammonium metavanadate. In the dryer apparatus, ammonium metavanadate is uniformly heated so that ammonia, water vapor, and oxygen evolve from the ammonium metavanadate and so that vanadium oxide is formed. The ammonium metavanadate and the vanadium oxide formed therefrom are continuously purged with an inert carrier gas to drive off the ammonia, water vapor, and oxygen. The ammonium metavanadate and the vanadium oxide are continuously agitated to ensure uniform heating and uniform exposure of all of the ammonium metavanadate and vanadium oxide to the carrier gas and to the heat so that the vanadium oxide that is formed is homogeneous.

The dryer apparatus 21 includes walls forming an interior chamber 25 in which ammonium metavanadate is synthesized into vanadium oxide. The walls function to seal the interior chamber 25 from the atmosphere around the dryer apparatus 21. The walls are preferably made of a substantially non-reactive material that conducts heat well, such as a mild steel.

Ammonium metavanadate is introduced, preferably continuously, into the dryer apparatus 21 from a source of ammonium metavanadate 29. The dryer apparatus 21 includes an inlet opening 31 through which ammonium metavanadate is introduced into the interior area 25. The inlet opening 31 is preferably sized such that only a desired amount of ammonium metavanadate powder is able to pass through the inlet opening and into the interior chamber 25 in a given amount of time. A valve 33 leading to the inlet opening 31 to facilitate may be provided for varying the amount of ammonium metavanadate introduced into the interior chamber 25 of the dryer apparatus 21. Ammonium metavanadate is preferably introduced into the interior chamber 25 of the dryer apparatus 21 through the inlet opening 31 from a source of ammonium metavanadate through a gravity feed, however, ammonium metavanadate may also be conveyed to the inlet opening with conveyor apparatus of the type that are well known, such as pumps, screw conveyors, etc. (not shown).

An outlet opening 35 through which vanadium oxide formed from the ammonium metavanadate is removed from the interior chamber 25 of the dryer apparatus 21 is also provided. The vanadium oxide is preferably continuously removed from the interior chamber 25 of the dryer apparatus 21. The vanadium oxide is preferably removed through the outlet opening 35 by gravity and falls, preferably still heated, into a receptacle 37. As when introducing ammonium metavanadate through the inlet opening 31, however, known conveyor apparatus may be provided to remove the vanadium oxide from the interior chamber 25 of the dryer apparatus 21 as well. An inert atmosphere is maintained in the receptacle 37 to prevent possible contamination of the vanadium oxide from exposure to atmospheric air. The inert atmosphere is preferably an argon or nitrogen atmosphere.

The dryer apparatus 21 includes an assembly 39 for continuously agitating and conveying the ammonium metavanadate, and the vanadium oxide formed from the ammonium metavanadate, through the interior chamber 25 of the dryer apparatus from the inlet opening 31 to the outlet opening 35. Several embodiments of the agitating and conveying assembly are described further below. An arrangement 53 for heating the interior chamber 25 of the dryer apparatus 21 to a temperature of approximately 440° C. is also provided so that the temperature of ammonium metavanadate in the interior chamber is raised to that temperature. The heating arrangement 53 preferably includes one or more resistance heating elements 55 in contact with or radiating heat toward the exterior 27 of the dryer apparatus 21. In accordance with a presently preferred embodiment, the heating elements 55 preferably maintain a constant temperature of approximately 440° C. in the interior chamber 25 of the dryer apparatus 21. The heating elements 55 may, of course, be located at any other convenient position on or near the exterior 27, or in the interior chamber 25, of the dryer apparatus 21 at which desired temperatures in the interior chamber of the dryer apparatus can be maintained.

Heating the ammonium metavanadate causes ammonia, water vapor, and oxygen to evolve from the ammonium metavanadate. An arrangement for purging the evolved ammonia, water vapor, and oxygen from the dryer apparatus 21 with an inert carrier gas is provided. The inert career gas is preferably $N_2$. The purging arrangement is preferably continuously operated so that evolved ammonia, water vapor, and oxygen are continuously purged, and so that the purge gas continuously flows in and out of the interior chamber 25 of the dryer apparatus 21, thereby reducing the risk that the purge gas will reduce the ammonium metavanadate or the vanadium oxide to $V_2O_5$. The purging arrangement includes one or more purging gas inlets 59 and one or more purging gas outlets 61 leading to the interior chamber 25 of the dryer apparatus 21, a source 63 of purging gas, which is preferably compressed gas, connected by a conduit 65 to the purging gas inlet 59, and a reservoir 67 for receiving spent purging gas connected by a conduit 69 to the purging gas outlet 61. The reservoir 67 preferably includes means for compressing the spent purging gas, such as a compressor, to facilitate recycling spent purging gas. The interior chamber 25 of the dryer apparatus 21 is sealed from contact with atmospheric air and is preferably maintained at a pressure at least slightly above atmospheric pressure to prevent inadvertent contamination of the vanadium oxide by atmospheric air.

In accordance with another embodiment, the heating elements 55 may be provided such that a temperature gradient is created in interior chamber 25 of the dryer apparatus 21 and the temperature is gradually raised to approximately 440° C. from a lower temperature, such as the ambient atmospheric temperature, either in a linear fashion or by a series of increasing temperature steps.

The dryer apparatus 21 is preferably provided with monitoring means 41 such as temperature probes for ensuring that desired temperatures are maintained in the dryer apparatus. Further, means 43 for obtaining product samples are preferably provided at various points in the dryer apparatus 21 to facilitate ensuring that synthesis of vanadium oxide from ammonium metavanadate is proceeding according to plan. The sampling means 43 preferably include sampling ports located at various positions in the dryer apparatus 21 through which samples of the ammonium metavanadate and the vanadium oxide are removed from the interior chamber 25 of the dryer apparatus for analysis.

Variables in the production process, such as temperature, rate of flow of carrier gas, and length of time during which the input materials are exposed to elevated temperatures and carrier gas are adjustable if it is observed that the product quality is not as desired. Because raw material is preferably continuously introduced into the interior chamber 25 of the dryer apparatus 21 and product is continuously removed from the interior chamber of the dryer apparatus, when poor quality product is detected, unlike in a batch process, the poor quality product is diverted from further production steps involving the use of the product. By contrast, in a batch process, if a sample of the batch is of poor quality, the entire batch is often of poor quality. An arrangement 47 for diverting poor quality product after it has passed through the outlet opening 35 in the dryer apparatus 21 is preferably provided. The diverting arrangement 47 preferably includes conduits and valves for stopping and permitting flow to the receptacle 37 and permitting and stopping flow to a waste reservoir 37'. As previously noted, the receptacle 37 receives the vanadium oxide in a still-heated condition and in the presence of an inert atmosphere, preferably Ar or $N_2$, thereby eliminating the need to cool the interior chamber 25 of the dryer apparatus 21 after vanadium oxide is synthesized in order to handle the product, as in many batch processes, and thereby facilitating continuous production. The receptacle 37, like the dryer apparatus 21, is sealed from the atmosphere to prevent contamination of the product.

Several embodiments of the dryer apparatus 21 distinguished by different agitating and conveying assemblies 39 are described below. To facilitate discussion of the different embodiments of the dryer apparatus 21, the embodiments of the dryer apparatus are identified as dryer apparatus 121, dryer apparatus 221, and dryer apparatus 321. The agitating and conveying assemblies 39 of the dryer apparatuses 121, 221, and 321 are, likewise, identified by the reference numerals 139, 239, and 339, respectively.

In accordance with a presently preferred embodiment, a dryer apparatus 121 includes an agitating and conveying assembly including a rotary, tray assembly 139 having a series of stacked, circular trays 141, as seen in FIG. 2. The trays 141 are preferably mounted on a common axle 143 extending through the wall 123 of the dryer apparatus 121 and are rotatable in the interior chamber 125 of the dryer apparatus. The edges 145 of the trays 141 preferably fit within the interior chamber 125 against the wall 123 so that material on an upper one of the trays does not inadvertently fall through a gap between the wall and the tray to a lower one of the trays. The ammonium metavanadate and vanadium oxide is, however, caused to fall through slits 147 formed in the trays 141 from upper ones of the trays to lower ones of the trays as the trays are rotated relative to the wall 123 of the dryer apparatus 121. A device 149 for rotating the trays 141, such as a variable speed electric motor connected to the axle 143, is provided to rotate the trays relative to the wall 123 of the dryer apparatus 121. Push-rod structures 151 are preferably attached to the interior chamber 125 of the dryer apparatus 121 near each of the trays 141 to agitate the ammonium metavanadate and the vanadium oxide as the trays are rotated relative to the wall 123 and the push-rod structures by the rotating device 149 to ensure even exposure of the ammonium metavanadate and the vanadium oxide to the heat and to the career gas and also to move the ammonium metavanadate and the vanadium oxide toward the slits 147 in each tray.

In the dryer apparatus 121 shown in FIG. 2, the heating arrangement 153 includes heating elements 155 that are arranged around the exterior 127 of the dryer apparatus. The heating elements can be, for example, band heaters or other heat exchange means. The heat exchange means allow, but do not require, each successively lower tray 141 to be maintained at a higher temperature than a previous, higher tray until a temperature suitable for synthesizing the ammonium metavanadate into vanadium oxide is reached, after which successive trays are maintained at the synthesizing temperature. The uppermost tray 141 may, for example, be maintained at a temperature approximately equal to that of the ambient atmospheric temperature, and the heating elements 155 heat the interior chamber 125 of the dryer apparatus 121 by successively lower trays to higher and higher temperatures. So that spent carrier gas and evolved ammonia, water vapor, and oxygen in the dryer apparatus 121 is continuously removed and replaced with fresh carrier gas, the dryer apparatus 121 is provided with one or more purging gas inlets 159 and one or more purging gas outlets 161.

The size of the slits 147 and the number of trays 141 in a dryer apparatus 121 and the speed of rotation of the trays in the dryer apparatus are preferably selected so that a given quantity of ammonium metavanadate is introduced to the interior chamber 125 of the apparatus 12 1 through the inlet opening 13 1, passes through the interior chamber of the dryer apparatus, in which the ammonium metavanadate is synthesized into vanadium oxide, and is removed from the interior chamber through the outlet opening 135 over a period of approximately two hours. Good results have been achieved by maintaining ammonium metavanadate at approximately 440° C. for approximately two hours.

In another embodiment of the present invention shown in FIG. 3, the dryer apparatus 221 includes a conveying and agitating assembly including a heated drum or calciner assembly 239 (hereinafter calciner apparatus), instead of a rotary tray assembly 139. The dryer apparatus 221 includes a wall 223 that forms an internal chamber 225. A helix 241 is disposed inside the internal chamber 225 such that, upon rotation of one or both of the helix or the wall 223, ammonium metavanadate and vanadium oxide is conveyed and agitated, as in a screw conveyor, from an inlet opening 231, through the interior chamber 225 of the dryer apparatus 221, toward an outlet opening 235. The helix 241 is preferably mounted on an axle 243 connected to a driving device 245, such as a variable speed electric motor, and rotates relative to the wall 223. The heating arrangement including heating elements 255 is preferably provided by the chamber 227 of the dryer apparatus 221. While the helix 241 and the wall 223 may be connected to one another so that rotation of the helix causes the wall 223 to rotate as well, such an arrangement makes it more difficult to mount heating elements 255 directly on the wall 223 of the dryer apparatus. Heating elements 255 for the dryer apparatus 221 including a rotating wall 223 arrangement are provided adjacent to, but not contacting, the exterior 227 of the wall. Further, the helix 241 may be stationary and the wall 223 may be rotatable relative to the stationary helix.

The purging system including one or more purging gas inlets 259 and one or more purging gas outlets 261 is provided. The purging gas inlets 259 and outlets 261, as well as the inlet opening 231 and the outlet opening 235, preferably extend through non-rotating beatings 263 for supporting the wall 223 and the helix 241. If the wall 223 does not rotate, additional purging gas inlets 259 and outlets 261 can be formed that extend through the wall at various points along the length of the interior chamber 225 of the dryer apparatus 221.

Ammonium metavanadate and vanadium oxide is conveyed from the inlet opening 231, through the interior chamber 225 of the dryer apparatus 221, to the outlet opening 235 through rotation of at least one of the wall 223 and the helix 241. Further, rotation of at least one of the wall 223 and the helix 241 agitates the ammonium metavanadate and the vanadium oxide so that the vanadium oxide that exits the outlet opening is uniformly exposed to heat and to career gas during its passage through the interior chamber 225 from the inlet opening 231 to the outlet opening 235 to facilitate synthesis of homogeneous vanadium oxide. The speed of rotation of at least one of the wall 223 and the helix 241 and the length of travel in the interior chamber 225 of the dryer apparatus 221 from inlet opening 231 to the outlet opening 235 is such that the ammonium metavanadate which is fed into the dryer apparatus through the inlet opening 231 is exposed to the heat and purging gases for a period of approximately two hours, during which time it is synthesized into vanadium oxide, before it exits the dryer apparatus through the outlet opening.

In another embodiment, a dryer apparatus 321 for synthesizing vanadium oxide from ammonium metavanadate is shown in FIG. 4. The dryer apparatus 32 1 includes the same features as the dryer apparatus 21 including a rotary tray assembly 139 and the dryer apparatus 221 including a calciner assembly 239; however, the dryer apparatus conveys and agitates the ammonium metavanadate and the vanadium oxide using a fluidized bed assembly 339.

The fluidized bed assembly 339 continuously agitates ammonium metavanadate and vanadium oxide as it is conveyed through the interior chamber 325 of the dryer apparatus 321 from the inlet opening 331 to the outlet opening 335. The fluidized bed assembly 339 includes a compressor 341 which circulates the carrier gas such that it suspends the ammonium metavanadate and the vanadium oxide in the interior chamber 325 of the dryer apparatus 321. The fluidized bed assembly 339 further includes a perforated plate or chute 343 that forms a portion of an enclosed chamber 345 into which the compressor 341 directs pressurized carrier gas. Pressurized carrier gas is vented up through the perforations 347 in the perforated plate or chute 343 to suspend the ammonium metavanadate and the vanadium oxide above the perforated, plate or chute. Preferably, the perforated plate or chute 343 is shaped, and the perforations 347 are formed, such that the suspended materials are suspended in a central area of the interior 325 of the dryer apparatus 321, so that only minimal amounts of the suspended materials stray from a main body of suspended materials and are drawn into the suction end 349 of the compressor 341. To extend the working life of the compressor 341, and to avoid the need for heating the compressor, the compressor is preferably disposed outside of the heated interior chamber 325 of the dryer apparatus 321 and one or more inlet and outlet conduits $351_{inlet}$ and $351_{outlet}$ extend from the interior of the dryer apparatus to the suction end 349 and the outlet end 350 of the compressor.

As with the other embodiments of the present invention, the wall 323 of the dryer apparatus 321 is heated by a heating arrangement including heating elements 355 so that the temperature within the dryer apparatus is maintained at approximately 440° C. The ammonium metavanadate and the vanadium oxide that is suspended by the fluidized bed assembly 339 is uniformly exposed to heat and carrier gas in the interior 325 of the dryer apparatus 321 to facilitate synthesis of homogeneous vanadium oxide. The fluidized bed assembly 339 is inclined at a slight angle θ downward from a point in the dryer apparatus 321 near the inlet opening 331 to a point in the dryer apparatus near the outlet opening 335 so that the suspended ammonium metavanadate and vanadium oxide flows from the inlet opening, through the interior chamber 325 of the dryer apparatus 321, to the outlet opening. As with the other embodiments of the invention, the angle θ and the length of the fluidized bed assembly 339 are selected so that the ammonium metavanadate travels through the interior chamber 325 of the dryer apparatus 321 from the inlet opening 331 to the outlet opening 335 over a period of approximately two hours.

As with the other embodiments of the present invention, one or more purging gas inlets 359 are provided and one or more purging gas outlets 361 are provided so that spent carrier gas in the interior chamber 325 of the dryer apparatus 321 is continuously removed and replaced with fresh carrier gas.

The general method of synthesizing vanadium oxide with the dryer apparatus 21 shown in FIG. 1, described below is applicable to synthesis of vanadium oxide using the dryer apparatuses 121, 221, and 321 which include the rotary tray assembly 139, the calciner assembly 239, and the fluidized bed assembly 339, respectively. According the method, at least a portion of the interior 25 of the dryer apparatus 21 is maintained at a temperature of approximately 440° C. by the heating arrangement 53. The interior 25 of the dryer apparatus 21 is continuously purged by the purging arrangement with an inert carrier gas.

The ammonium metavanadate in interior 25 of the heated and purged dryer apparatus 21 is continuously agitated over a period of approximately two hours by the agitating assembly 39 so that the ammonium metavanadate is uniformly exposed to heat and to the purging gas and forms homogeneous vanadium oxide. In the dryer apparatus 121 including the rotary tray assembly 139 shown in FIG. 2, the ammonium metavanadate rests on rotating trays 141 of the rotary tray apparatus and is continuously agitated by rotation of the trays relative to push rods 151 fixedly mounted on the wall 123 of the dryer apparatus. As the trays 141 rotate, the push rods 151 also move the ammonium metavanadate toward slits 147 in rotary, trays 141 so that the ammonium metavanadate tails to lower ones of the trays through the interior 125 of the dryer apparatus 121 and toward the outlet opening 135 from upper ones of the trays closer to the inlet opening. In the dryer apparatus 221 including the rotary, calciner assembly 239 shown in FIG. 3, the ammonium metavanadate is moved through the interior 225 of the dryer apparatus from the inlet opening 231 toward the outlet opening 235 by rotation of the helix 241 or the wall 223 or both such that ammonium metavanadate and vanadium oxide is continuously conveyed and agitated, as in a screw conveyor. In the dryer apparatus 321 including the fluidized bed assembly 339 shown in FIG. 4, the ammonium metavanadate is moved through the interior 325 of the dryer apparatus from the inlet opening 331 toward the outlet opening 335 under the force of gravity as ammonium metavanadate and vanadium oxide suspended above the perforated plate or chute 343 travels down the perforated plate or chute that is inclined at the angle Θ. In all of the apparatuses, 21, 121, 221, and 321, the ammonium metavanadate is agitated in the presence of the purging gas such that it is uniformly exposed to heat and purging gas over a period of approximately two hours to form vanadium oxide.

The temperature in the interior 25 of the dryer apparatus 21 may be raised to approximately 440° C. from a lower temperature such that the temperature increases in a series of steps by positioning heating elements 55 at various positions along the height or length of the dryer apparatus so that zones of increasing temperature are created. To create distinct temperature zones it is preferred to thermally isolate the different zones from one another with insulation, thereby forming, in effect, several distinct ovens. Temperature zones may be formed in the interior portions 25, 125, 225, and 325 of each of the dryer apparatuses 21, 121, 221, and 321 by thermally isolating portions of the dryer apparatuses from one another such as, for example, by insulating succeeding areas of the dryer apparatuses from one another. Also, several dryer apparatuses may be connected to one another in series (not shown) and operated at different operating temperatures to obtain different temperature zones.

The temperature in the interior 25 of the dryer apparatus 21 may be raised to approximately 440° C. from a lower temperature such that the temperature increases linearly by positioning heating elements 55 at various positions along the height of the dryer apparatus so that the temperature increases substantially uniformly until a desired temperature is reached. In the dryer apparatus 121 including the rotary tray assembly 139, a substantially linearly increasing temperature profile may be achieved, for example, by positioning heating elements 155 at a lower portion of the dryer apparatus such that upper portions of the dryer apparatus, such as upper ones of the trays 141, are heated by a combination of conducted and convected heat.

The foregoing has described the principles, preferred embodiments, and modes of operation of the present invention. However, the invention should not be construed as limited to the particular embodiments discussed. Instead, the above-described embodiments should be regarded as illustrative rather than restrictive, and it should be appreciated that variations may be made in those embodiments by workers skilled in the art without departing from the scope of the present invention as defined by the following claims.

What is claimed is:

1. An apparatus for the continuous synthesis of vanadium oxide from ammonium metavanadate, comprising:

one or more chamber walls defining an interior chamber of the apparatus, the interior chamber of the apparatus being sealed from an atmosphere surrounding the apparatus;

a source of ammonium metavanadate means for continuously introducing ammonium metavanadate from said source to the interior chamber of the apparatus through an inlet;

means for heating the interior chamber of the apparatus to a temperature of approximately 440° C.;

means for purging the interior chamber of the apparatus with an inert carrier gas to remove ammonia, water vapor, and oxygen that evolves from heated ammonium metavanadate;

means for continuously agitating ammonium metavanadate in the interior chamber of the apparatus while the interior chamber of the apparatus is heated by the heating means and while ammonia, water vapor, and oxygen are purged by the purging means such that ammonium metavanadate is uniformly exposed to heat and purging gas;

means for continuously removing vanadium oxide from the interior chamber of the apparatus through an outlet; and means for continuously conveying the ammonium metavanadate and the vanadium oxide through the interior chamber of the apparatus from the introducing means to the removing means, the conveying means including one or more rotary trays that are arranged vertically between the introducing means and the outlet.

2. The apparatus of claim 1 wherein the means for heating the interior chamber maintains a temperature of approximately 440° C. in the interior chamber.

3. The apparatus of claim 1 wherein the heating means comprises resistance heating elements.

4. The apparatus of claim 1, wherein the heating means raises the temperature in the interior chamber of the apparatus to approximately [3] 440° C. at the outlet from a lower temperature at the inlet.

5. The apparatus of claim 4, wherein the heating means raises the temperature in the interior chamber of the apparatus such that the temperature increase in the interior chamber of the apparatus is stepped.

6. The apparatus of claim 4, wherein the heating means raises the temperature in the interior chamber of the apparatus such that the temperature increase in the interior chamber of the apparatus is substantially linear.

7. The apparatus of claim 1, wherein the conveying means includes two or more rotary trays arranged in a stack, upper ones of the rotary trays being formed with one or more slots through which ammonium metavanadate and vanadium oxide fall to lower ones of the rotary trays, wherein the apparatus comprises means that are attached to the interior chamber walls for agitating ammonium metavanadate and vanadium oxide so that ammonium metavanadate and vanadium oxide moves toward the one or more slots in the rotary tray wherein the agitating means comprises push rods that form part of both the conveying means and the agitating means.

8. The apparatus of claim 7 wherein the means for heating the interior chamber maintains a temperature of approximately 440° C. in the interior chamber.

9. The apparatus of claim 7 wherein the heating means comprise resistance heating elements.

10. The apparatus of claim 7, wherein the heating means raises the temperature in the interior chamber of the apparatus to approximately 440° C. at the outlet from a lower temperature at the inlet.

11. The apparatus of claim 10, wherein the heating means raises the temperature in the interior chamber of the apparatus such that the temperature increase in the interior chamber of the apparatus is stepped.

12. The apparatus of claim 10 wherein the heating means raises the temperature in the interior chamber of the apparatus such that the temperature increase in the interior chamber of the apparatus is substantially linear.

13. The apparatus of claim 1 wherein the interior chamber is maintained at a pressure that is higher than that of the surrounding atmosphere.

14. The apparatus of claim 7, wherein the interior chamber is maintained at a pressure that is higher than that of the surrounding atmosphere.

15. The apparatus of claim 4, wherein the interior chamber is maintained at a pressure that is higher than that of the surrounding atmosphere.

16. The apparatus of claim 2, wherein the interior chamber is maintained at a pressure that is higher than that of the surrounding atmosphere.

17. The apparatus of claim 3, wherein the interior chamber is maintained at a pressure that is higher than that of the surrounding atmosphere.

18. The apparatus of claim 10, wherein the interior chamber is maintained at a pressure that is higher than that of the surrounding atmosphere.

19. The apparatus of claim 8, wherein the interior chamber is maintained at a pressure that is higher than that of the surrounding atmosphere.

20. The apparatus of claim 9, wherein the interior chamber is maintained at a pressure that is higher than that of the surrounding atmosphere.

21. The apparatus of claim 1, wherein the conveying means include means to cause the ammonium metavanadate to move in a first direction from said inlet to said outlet and wherein the purging means include means to cause the inert carder gas to flow in a second direction that is co-current or cross-current relative to said first direction.

22. The apparatus of claim 7, wherein the conveying means include means to cause the ammonium metavanadate to move in a first direction from said inlet to said outlet and wherein the purging means include means to cause the inert carder gas to flow in a second direction that is co-current or cross-current relative to said first direction.

23. The apparatus of claim 4, wherein the conveying means include means to cause the ammonium metavanadate to move in a first direction from said inlet to said outlet and wherein the purging means include means to cause the inert carder gas to flow in a second direction that is co-current or cross-current relative to said first direction.

24. The apparatus of claim 2, wherein the conveying means include means to cause the ammonium metavanadate to move in a first direction from said inlet to said outlet and wherein the purging means include means to cause the inert carrier gas to flow in a second direction that is co-current or cross-current relative to said first direction.

25. The apparatus of claim 3, wherein the conveying means include means to cause the ammonium metavanadate to move in a first direction from said inlet to said outlet and wherein the purging means include means to cause the inert carder gas to flow in a second direction that is co-current or cross-current relative to said first direction.

26. The apparatus of claim 10, wherein the conveying means include means to cause the ammonium metavanadate to move in a first direction from said inlet to said outlet and wherein the purging means include means to cause the inert carder gas to flow in a second direction that is co-current or cross-current relative to said first direction.

27. The apparatus of claim 8, wherein the conveying means include means to cause the ammonium metavanadate to move in a first direction from said inlet to said outlet and wherein the purging means include means to cause the inert carrier gas to flow in a second direction that is co-current or cross-current relative to said first direction.

28. The apparatus of claim 9, wherein the conveying means include means to cause the ammonium metavanadate to move in a first direction from said inlet to said outlet and wherein the purging means include means to cause the inert carrier gas to flow in a second direction that is co-current or cross-current relative to said first direction.

* * * * *